United States Patent Office 3,817,815
Patented June 18, 1974

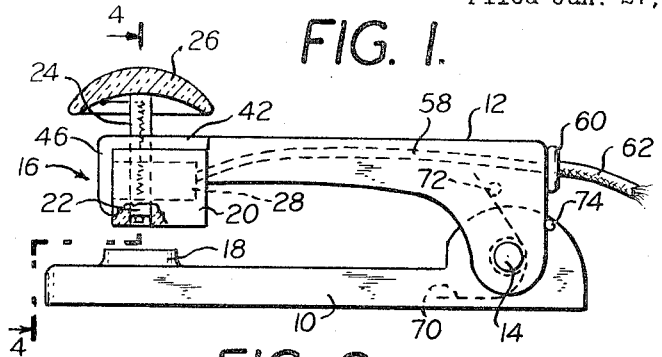
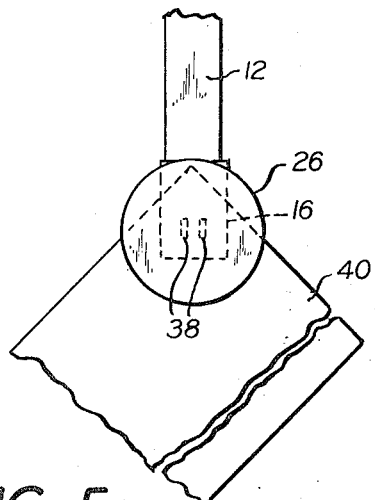
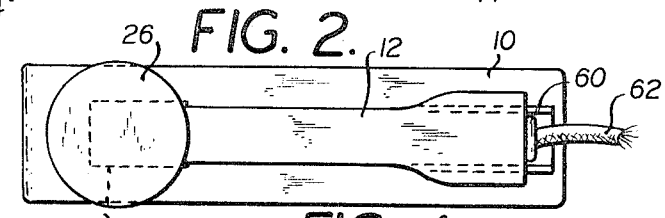
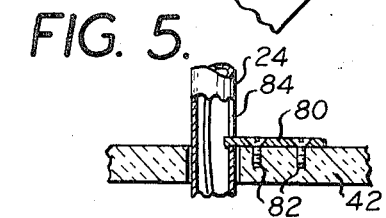
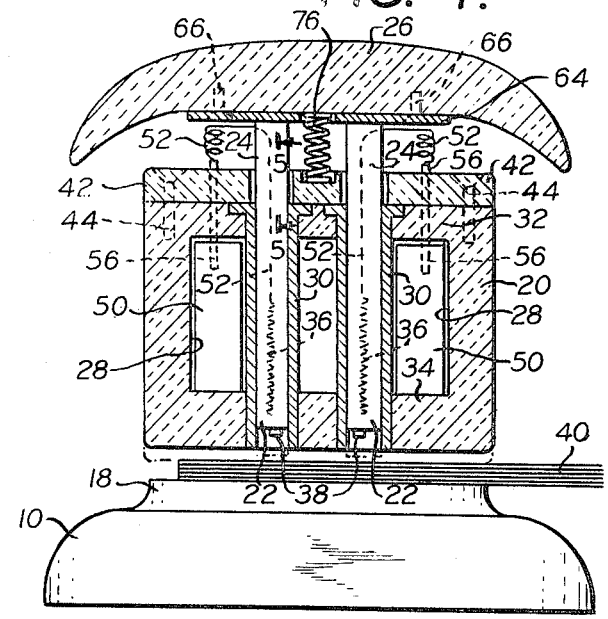
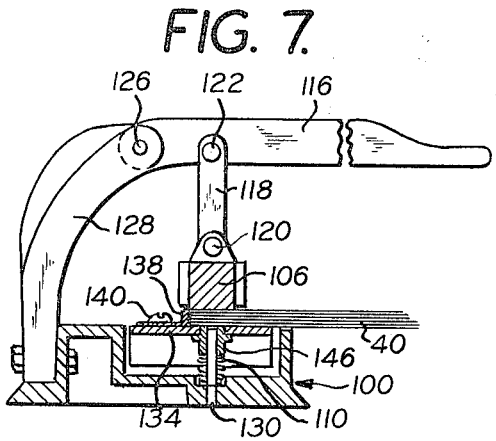
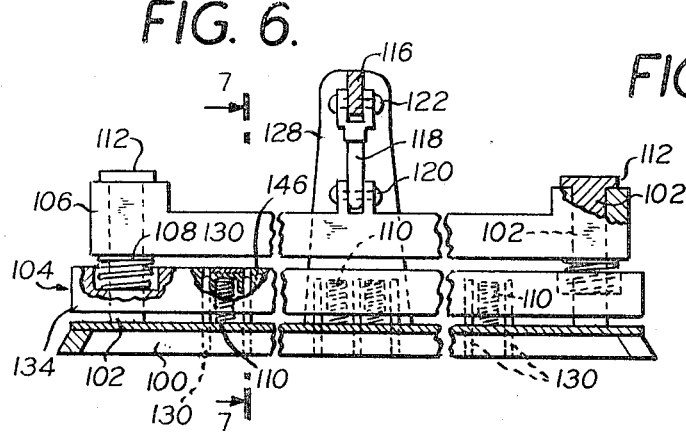
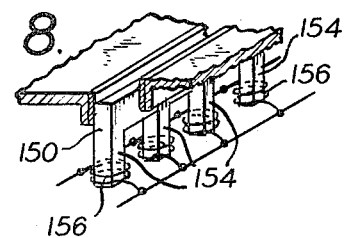

3,817,815
WELDING APPARATUS FOR PAPER
Bernard T. Sendor, 608 Blair Drive, Westbury, N.Y. 11590, and Mortimer S. Sendor, 80—30 221st St., Queens Village, N.Y. 11427
Filed Jan. 27, 1972, Ser. No. 221,313
Int. Cl. B30b 15/34
U.S. Cl. 156—583    9 Claims

ABSTRACT OF THE DISCLOSURE

The invention relates to apparatus for welding sheets of paper together by applying energy to the sheets to weld them together when in contact with one another. The apparatus is used with special paper that bonds together when subjected to heat and this apparatus applies heat to selected areas in place of a stapling machine. Temperature of the heating elements is controlled to prevent scorching of the paper and the heating elements retract after each operation to locations which make it impossible for the operator of the apparatus to be burned accidentally by touching the heating elements. The welder can be used for welding individual sheets together along an edge thereof to make a booklet from pre-cut or folded sheets.

BACKGROUND AND SUMMARY OF THE INVENTION

Paper of the type welded to make books in accordance with our Pat. No. 3,560,290, issued Feb. 2, 1971, can be used as small individual sheets, such as letter size, and joined together by heat applied with the apparatus of this invention. When application of heat to the paper is referred to, it will be understood that energy can be applied to the paper from sources that produce heat or resin flow with resulting adhesion.

Sheets of a letter can be welded together at their upper left hand corners, in the way that ordinary sheets of paper are stapled together for letters. The welded bond has the advantage that it does not increase the thickness of the letter at the connected corner, and form letters can be stacked without the bulking of the fastened corner that is encountered with stapled letters. From flat stacks, letters can be supplied to automatic folding and inserting machines. Such letters are also more neatly filed.

When pre-cut sheets are to be connected together in booklets or briefs, they can be welded simultaneously at spaced spots, or along a line weld, that provide a straight binding for neater opening and that can be done more quickly than using lines of staples.

For legal documents, signed and acknowledged on the last sheet of a number of connnected sheets, pages cannot be substituted when using welded sheets without the substitution being evident because completed welds pulled apart cause splitting of the paper.

This invention has heated welding elements that contact with the paper to push a top sheet against underlying sheets to make the welds, and in the preferred embodiment these elements are electrically heated and have temperature control thermostats to limit the temperature to a value that will not scorch the paper when the apparatus is used to weld the sheets to one another. Since the appartus may be hand operated, provision is made for withdrawing the heating elements into protective recesses to avoid burns which could occur from accidental touching of the heating elements by an operator using the apparatus.

tOher features of the invention relate to simplified construction for making the apparatus reliable, inexpensive to manufacture, and convenient to use. Other objects, features and advantages will appear or be pointed out as the description proceeds.

BRIEF DESCRIPTION OF DRAWING

In the drawing, forming a part thereof, in which like reference characters indicate corresponding parts in all the views:

FIG. 1 is a diagrammatic side elevation, partly broken away and in section, showing a manually operated welding apparatus which can be used in place of a stapling machine;

FIG. 2 is a top plan view of the apparatus shown in FIG. 1;

FIG. 3 is a fragmentary view showing the manner in which the apparatus of FIGS. 1 and 2 is used to staple sheets of paper together at the upper left hand corners of the sheets in the manner conventional for connecting sheets by a metal staple;

FIG. 4 is an enlarged sectional view taken on the line 4—4 of FIG. 1;

FIG. 5 is a sectional view taken on the line 5—5 of FIG. 4;

FIG. 6 is a front view, partly broken away and in section, illustrating a modified form of the invention for spot welding a stack of papers along the entire length of one edge of the stack;

FIG. 7 is a sectional view taken on the line 7—7 of FIG. 6; and

FIG. 8 is a fragmentary isometric view showing a modified construction for making a line weld in place of spot welds with apparatus such as shown in FIG. 6.

DESCRIPTION OF PREFERRED EMBODIMENT

FIG. 1 shows apparatus consisting of a base 10 which rests on a table or desk and an arm 12 connected to the base by a pivot connection bearing 14. At the free end of the arm 12, there is a first jaw 16 which moves toward and from a second jaw 18 connected with the base 10. The first jaw 16 is an integral part of the arm 12 and as the jaw 16 moves toward and from the jaw 18, the arm 12 moves angularly on the pivot connnection 14.

The first jaw 16 includes a frame 20 secured to the arm 12 and preferably of one-piece construction therewith. The frame portion 20 of the jaw 16 carries a heater portion 22 of the jaw.

The heated portion 22 is movable with respect to the frame portion 20; and when the apparatus is not in use, the heated portion 22 is in a retracted position within the frame portion 20 so that the heated portion 22 cannot be touched accidentally by a person using the apparatus. This precaution is to avoid burns by the lower end of the heated portion 22 which is heated in order to weld together sheets of paper placed between the jaws 16 and 18.

An extension 24 of the heated portion 22 projects upward beyond the upper end of the frame portion 20 and connects with a knob 26 which is the actuator for the apparatus. Manual pressure downward on the knob 26 causes the first jaw 16 to move downward into contact with the paper placed on the second jaw 18; and when the frame portion 20 of the jaw 16 cannot move downward any further, further pressure on the knob 26 causes the heated portion to move downwardly and out of the frame portion 20 and into contact with the paper clamped between the jaws 16 and 18.

Conversely, when the pressure on the knob 26 is released, the heated portion 22 moves upwardly into its recess in the frame portion 20 before the frame portion moves upward away from the second jaw 18. The mechanism for accomplishing this result will be explained in connection with FIG. 4.

FIG. 4 is a sectional view through the first jaw 16 and through the knob 26 and the connections between the knob and the first jaw. The frame portion 20 is preferably hollow. The hollow interior forms a chamber 28. Two bushings 30 extend through a top wall 32 and a bottom well 34 of the frame portion 20, and these bushings 30 provide bearings in which the heated portions 22 of the first jaw slide.

In the preferred construction illustrated in FIG. 4 there are two bushings 30 and the first jaw is equipped with two heated portions 22; but it will be understood that the apparatus can be made with only one heated portion or with a greater number of heated portions than those shown.

Each of the heated portions 22 contains a resistance coil 36 to which electricity is supplied for heating the heated portion 22. In the illustrated construction, the bottom face of each of the heated portions 22 has a projection 38 which makes the contact base of the heated portion 22 of smaller area than the cross section of the heated element and this increases the pressure exerted against sheets of paper 40 that are resting on the second jaw 18. The lower ends of the heated portions 22 are shown in dotted lines in FIG. 4 in welding position.

A top plate 42 is attached to the upper part of the frame portion 20 by detachable fastening means such as screws 44. This top plate 42 has a downwardly extending front cover 46, shown in FIG. 1, which closes the otherwise open front of the chamber 28. Thermostats 50 are located in the chamber 28 and are originally inserted into the chamber through the front end before the cover 46 is placed on the frame portion 20. There is preferably a separate thermostat for the circuit of each of the heated elements 22 and FIG. 4 shows wiring 52 extending upwardly in the heated portions 22 from the resistance heating coil 36 and leading out through the side of each of the heated elements 22 near its upper end. The wiring 52 includes some free turns of wire forming a coil that permits up and down movement of the heated elements 22 while terminals 56 at the other ends of the wiring 52 are held in fixed positions by extending through the top plate 42 and the top of the frame portion 20 into sockets in the thermostats 50.

The other side of each of the thermostats 50 is connected with wiring 58 (FIG. 1) leading through the arm 12 and coming out of the arm 12 at the grommet 60. Beyond the grommet 60 there is enough additional wiring 62 to conveniently reach a socket or electrical convenience outlet.

The upward extensions 24 of the heated elements 22 are rigidly connected with a metal plate 64 (FIG. 4) which is attached to the underside of the knob 26 by screws 66 or other fastening means.

Referring again to FIG. 1, the arm 12 is held in the raised position as shown by spring means similar to those used for supporting the arm of a desk stapler. In the drawing this spring means is illustrated diagrammatically as a spring 70 resting against a surface inside the base 10 and with a few turns around the pivot connection 14 and with the far side of the spring 70 against a stop 72 rigidly secured to the inside of the arm 12. The limit to which the spring 70 can raise the arm 30 is limited by a stop 74 connected to the base in position to be struck by the arm 12 when the arm swings angularly in a clockwise direction in response to the force of the spring 70. Other configurations of spring and its stop mechanisms can be used.

FIG. 4 shows the plate 64 and its connected knob 26 urged upward by a coil spring 76 compressed between the knob 26 and the top plate 42. The effective force of this spring 76 is greater than that of the spring 70. (FIG. 1) which holds the jaws 16 and 18 apart. Thus when a downward force is applied to the knob 26 by manual pressure, the spring 70 yields first and permits the first jaw 16 to move into contact with the paper on the second jaw 18 before the spring 26 yields to permit the heated portions 22 of the apparatus to move down into contact with the sheets of paper to weld the sheets together.

FIG. 5 is a sectional view illustrating a stop 80 attached to the top plate 42 by screws 82. This stop 80 has an end portion projecting into a slot 84 in the upward extension 24 of one of the heated portions of the first jaw 16. When the lower end of the slot 84 comes against the bottom of the stop 80, then the spring 76 (FIG. 4) cannot raise the knob 26 or the heated portions 22 any higher.

The paper welder shown in FIGS. 1, 2 and 4 can be used to fasten sheets of paper together by welding the sheets at a corner as shown in FIG. 3, or by welding them at spaced points across their top edges or side edges at locations similar to those used for wire staples. The welded connections have the advantage, however, that they do not provide any protrusion which makes the connected sheets thicker where connected and which causes bunching when connected sheets are piled together one on top of another preparatory to folding and mailing.

The invention can be modified so as to connect the edges of sheets of paper together either by spot welding the edges along a straight line at spaced locations with all welds made simultaneously; or by welding the sheets along the edge in a continuous straight line. Where sheets are to be connected along an entire top or side edge, the apparatus shown in FIGS. 6-8 performs the operation much more quickly than by making successive welds with the desk welder shown in FIGS. 1-5.

FIG. 6 shows paper welding apparatus having a fixed base 100 with a plurality of guide posts 102 extending upwardly parallel to one another and at right angles to the top surface of the base 100. These guide posts 102 are integrally connected with the base 100. Two such guide posts are shown in FIG. 6, but the number of posts provided depends upon the size of the apparatus and the diameter and stiffness of the posts.

A first jaw 104 fits over the guide posts 102 and slides up and down on these guide posts which serve as bearings jaw 106 which fits the same guide posts 102 and moves up and down on these guide posts which serve as bearings for both of the jaws 104 and 106. Springs 108 which are shown surrounding the guide posts 102 and extending into sockets in the top surface of the first jaw 104 hold the jaws 104 and 106 spaced from one another when the apparatus is not in operation.

Other springs 110 compressed between the first jaw 104 and sockets in the base 100 urge the first jaw 104 upward away from the base 100 and through the springs 108 also urge the second jaw 106 upward. There are heads or collars 112 at the upper ends of the guide posts 102 for limiting upward movement of the jaws 104 and 106. A handle 116 is connected to the second jaw 106 by a link 118 which has a pivot connection 120 with the jaw 106 and a pivot connection 122 with the handle 116. This handle 116 is connected by a pivot connection 126 to a fixed fulcrum arm 128 which extends upward from the stationary base 100.

It will be apparent from FIG. 7 that movement of the handle 116 in a clockwise direction around the pivot connection 126 causes the jaw 106 to be moved downward. When pressure on the handle 116 is released, the springs described in connection with FIG. 6 lift the jaw 106 and move the handle 116 counterclockwise about its pivot connection 126.

The first jaw 104 has heated portions 130 which are located along a straight line at spaced apart locations depending upon how far apart it is desired to have the spot welds on the finished work. These heated portions 130 are preferably cylindrical elements that slide in bearings in a frame portion 134 of the jaw 104, and they are heated internally by electrical resistance coils and may be otherwise the same as the heated portions of the welding apparatus described in FIGS. 1 and 4. The wiring, thermostats and other connections already illustrated in FIGS. 1 and 4 for the heated elements in the modification illustrated in those figures are, therefore, unnecessary to illustrate in FIGS. 6 and 7.

One difference between the heated elements 130 and those shown in FIGS. 1 and 4 is that the heated elements 130 in FIGS. 6 and 7 are stationary and do not move with the first jaw 104. They are connected at their lower ends to the fixed base 100 and extend upwardly through bearings in the frame portion 134 of the first jaw 104. When this first jaw 104 is in the position shown in FIG. 6, the heated portions 130 have their upper ends located in recesses in the upper ends of the bearings in the frame portion 134 on which the frame portion moves with respect to the stationary heated portions 130.

When the jaws 104 and 106 are in their at rest positions shown in FIGS. 6 and 7, sheets of paper 40 (FIG. 7) are inserted between the jaws and push in against a stop 138 which is connected to the top of the frame portion 134 of the first jaw by a screw 140, or other means which permit the stop 138 to be adjusted to the right and left in FIG. 7 depending upon how close to the edge of the sheets of paper 40 the welds are to be located.

The handle 116, or other acuator, is then operated to push the second jaw 106 downward until it comes in contact with the sheets of paper 40. The springs 110 (FIG. 6) are stronger than the springs 108 so that the springs 108 yield first to permit the second jaw 106 to move into contact with the paper and put the paper under some pressure before the pressure on the paper forces the first jaw 104 downward, against the pressure of the springs 110 and toward the base 100. The downward movement of the frame portion 134 of the first jaw 104 causes the paper to be brought into contact with the heated portions 130 and the contact of the heated portions 130 with the clamped together sheets of paper causes the sheets to be welded together.

When force of the handle 116, or other actuator, is relieved, the springs 110 push the frame portion 134 upward so that the welded paper is lifted off the ends of the heated portions 130 and when these springs 110 reach their limit of travel, the springs 108 lift the second jaw 106 out of contact with the sheets of paper so that the welded-together sheets can be removed from the apparatus.

From the description of the operation of the apparatus illustrated in all of the figures, it will be evident that the initial relative movement of the heated portions of the first jaw back into the sockets provided by the upper ends of the bearings in which they have their relative movement with respect to the frame portion of the first jaw serves to strip the paper sheets from the ends of the heated elements that make the welds. Thus any slight sticking of the heated welding surfaces to the paper with which these surfaces contact cannot interfere with the proper functioning of the apparatus.

The heated portions of the welding apparatus are prevented from becoming hot enough to scorch the paper by use of thermostats located in the apparatus close enough to the heated portions to be responsive to the temperature of the heated portions. These thermostats are set so as to cut off further flow of current to the heating elements when the temperature adjacent to the thermostats rises above a predetermined limit. The actual temperature to which the welding surfaces of the heated portions rise depends upon the characteristics of the paper with which the apparatus is intended to be used. This temperature will usually be high enough to burn the skin of an operator who touches one of the heated portions and it is for this reason that the apparatus is made so that the heated portions are never exposed in positions where they can be accidentally touched by an operator. For example, after making a weld, the heated portions withdraw into their sockets before the jaws move apart and when the jaws are apart, there is not sufficient clearance between them for a person to insert a finger into a position where the finger could extend into one of the sockets far enough to touch a heated portion of the apparatus.

For safety and operator comfort, however, it is also desirable to prevent the frame portion of the jaw that has the heated portions from becoming excessively hot on its surfaces which are exposed to being touched by an operator using the apparatus. The spread of heat from the heated portions into the frame portion can be prevented in a number of ways. In the construction illustrated in FIGS. 1 and 4, the frame portion 20 is preferably made of a material which is a poor conductor of heat. For example, thermosetting plastic, such as phenolic, can be used or any ceramic material which has the necessary strength.

In FIGS. 6 and 7, the frame portion 134 can be made of material which is a poor conductor of heat, but since there is more heat generated in this modified form of the invention because of the larger number of heated portions, the bearings 146, in which the heated portions 130 and the frame portions 134 have their relative movement, are also of heat insulating material.

FIG. 8 shows a modified construction in which a heated element 150 consisting of a continuous bar is substituted for the spaced spot welding heating elements 130 shown in FIG. 6. The bar of the heating element 150 produces a continuous weld along the edge portion of the paper sheets in place of the spaced spot welds produced by the apparatus shown in FIG. 6. The bar of FIG. 8 makes a stronger weld if sufficient pressure for good contact is available; but the spot welding heating portions of FIG. 6 can make simultaneous welds with somewhat less pressure exerted by the apparatus.

The apparatus of FIGS. 6–8 can be made so that half the width of the sheets can be inserted past the line of welding and the sheets supported along a line where they are to be folded so as to produce a "saddle bound" booklet.

The heated portion 150 of FIG. 8 is shown constructed with cut-outs at its lower edge dividing the lower portion of the bar into a plurality of posts 154, and there are separate resistance elements 156 wrapped around each of the posts 154 for maintaining the temperature of the heated portion 150.

The heated portion 150 is used with the same kind of apparatus as the heated portions 130 of FIG. 6 but with a slot substituted for the independent openings provided in the frame portion 134 for the separate heated elements 130 of FIG. 6. The degree of heat is controlled by thermostats as in the other constructions and the upper edge of the heated element 150 of FIG. 8 is located in the upper end of a bearing slot as a recess to protect it from being accidentally touched by an operator.

The apparatus of this invention can be used with the same kind of paper referred to in our Patent No. 3,560,290 or with any other paper having a resin system which responds to heat to bond the pages together. Although paper is not a good conductor of heat, it conducts well enough to weld a number of sheets together when conduction alone is relied upon to transmit heat from the outside of a stack through to the inner sheets. With the illustrated embodiments of this invention, only one jaw is heated, but it will be evident that for welding together thicker stacks of paper it is advantageous to have both jaws heated since this permits heat to penetrate from both sides of the stack simultaneously and thus cuts in half the distance that heat must travel through the paper to reach the sheets that are furthest from the surface of the heated portion of the clamping jaws.

For a portable welder, such as a desk welder as shown in FIGS. 1–5, the number of sheets to be welded is not sufficient to require production of heat in the paper other than by conduction. For the apparatus shown in FIGS. 6–8, additional heating means may be provided if briefs or books of substantial thickness are to be welded. For example, in addition to the heat provided by heating one or both of the clamping jaws, provision may be made for generating heat within the paper itself by a radio-frequency field as also described in our Pat. No. 3,560,290, previously referred to, or other applicable types of energy.

The preferred embodiments of the invention have been illustrated and described, but changes and modifications can be made and features of the invention can be used in different combinations without departing from the invention as defined in the claims.

What is claimed is:

1. Apparatus for welding together a group of touching paper sheets each of which contains a resin system that bonds to the other when heated to a predetermined temperature including in combination a first jaw that contacts with one side of the group of sheets, a frame constituting a part of the first jaw, a second jaw, bearing means on which the jaws have relative movement with respect to one another and by which they are guided as they move into contact with the opposite side of the group of sheets, a heated portion in one of the jaws, a bearing carried by the frame and on which the heated portion has relative movement with respect to the frame and both jaws, an actuator causing the heated portion to exert welding pressure on the group of paper sheets while they are held between said jaws, means for heating and maintaining the heated portion at the bonding temperature of the paper, said first jaw having a recess in the frame, the heated portion having relative movement with respect to the bearing into and out of the recess, the heated portion, when retracted into the recess, being in a protected position where it cannot be touched accidently by a hand of an operator of the apparatus and the activating means including motion transmitting means by which the activator projects said heated portion from the recess and into contact with the paper between the jaws with each operation of the welding apparatus.

2. The apparatus described in claim 1 characterized by the actuator including means that bring the frame portion of the first jaw into contact with the paper first to clamp the paper against the second jaw, and motion-transmitting means by which the actuator thrusts the heated portion of the first jaw from the recess after the paper is clamped against the second jaw, the actuator including pressure means that withdraw the heated portion of the first jaw into the recess before the frame portion of the first jaw is released from its position clamping the paper against the second jaw, the heated portion being smaller than the sheets of paper with which the apparatus is intended to be used so that the withdrawal of the heated portion into the recess strips the paper from the heated portion of the first jaw.

3. The apparatus described in claim 1 characterized by the apparatus including a fixed base to which the second jaw is connected, an arm pivotally connected to the base at an end of the base remote from the second jaw, the the first jaw having its frame portion connected with the arm at the end of the arm remote from the pivot connection of the arm and base, the end of the bearing that is nearer to the second jaw being the recess, the actuator including an extension of the heated portion through the top of the frame portion and including also a force applying element secured to the end of said extension above the frame portion, a spring operably connected with the force applying element and said frame portion in position to urge the frame portion of the first jaw to move as a unit with the force applying means when the force applying means begins its movement, said spring yielding after the jaws clamp the paper to permit continued movement of the force applying means and resulting thrusting of the heated portion of the first jaw and into contact and welding pressure with the paper clamped between the jaws.

4. The apparatus described in claim 1 characterized by the heated jaw having a row of heating elements in a straight line, a stop against which the edges of a group of sheets are contacted to locate the sheets in position for the heated elements to spot weld the sheets together along edge portions of the sheets adjacent to the stop.

5. The apparatus described in claim 1 characterized by the heated jaw including a relatively fixed heated portion and a frame portion that has movement with respect to the relatively fixed portion and that has socket means in which the heated portion is recessed when the frame portion is in a raised position, resilient means holding the frame portion in said raised position, the other jaw being movable from a position spaced from the frame portion of the heated jaw into a position close to the heated jaw to clamp paper sheets between the other jaw and the frame portion of the heated jaw and then movable further to depress the frame portion of the heated jaw against the force of said resilient means until the frame portion moves down to a level that leaves the heated portion of the heated jaw in contact with the paper.

6. The apparatus described in claim 5 characterized by a stationary base, guides extending upwardly from the stationary base, bearing means on both the frame portion of the heated jaw and the other jaw for guiding the frame portion and other jaw in their movement, springs between the frame portion and the other jaw maintaining the frame portion and other jaw at a distance from one another to admit a stack of paper therebetween, a bearing supported from the base in a fixed position with respect to the base, the actuator being movable about said bearing that is supported from the base, a stop that limits the extent to which the stack of paper can be inserted between the jaws, the heated portion of the heated jaw being secured to the base in a fixed position on the base, an opening in the frame portion through which the heated portion extends upwardly toward the other jaw, the upper end of the heated portion being somewhat below the upper end of the opening when the frame portion of the heated jaw is in its raised position, the resilient means for holding the frame portion in said raised position including springs compressed between the frame portion and the base, electric heating elements supported by the base in position to heat the heated portion of the heated jaw, and heat insulating means between the frame portion and the heated portion for limiting transfer of heat from the heated portion to the frame portion.

7. The apparatus described in claim 6 characterized by the heated portion of the heated jaw comprising a plurality of metal studs secured at their lower ends to the base and each extending upwardly to a different opening in the frame portion of the heated jaw, electric heating means for each of the studs, and the means for limiting transfer of heat from the heated portion to the frame including heat insulating bushings in the opening through which the studs extend through the frame portion, said bushings also serving as guide bearings for preventing transverse displacement of the upper ends of the studs when clamped against a stack of sheets between the jaws.

8. The apparatus described in claim 6 characterized by the heated portion of the heated jaw constituting an elongated bar extending for substantially the full length of the stack of sheets which can be clamped between the jaws, the opening in the frame portion being an elongated slot extending in the direction in which the bar extends and into which the upper end of the bar projects with the upper end of the bar spaced somewhat below the top of the frame portion when the frame portion is in its raised position whereby the bar is within the recess provided by the slot and protected from accidental contact by a person handling stacks of paper on the frame portion, the frame portion being movable downwardly from its raised position far enough to bring the stack of paper between the jaws into firm contact and welding pressure against the heated bar, the means for preventing heat transfer between the bar and the frame portion being a heat insulating lining in the slot on both sides of the bar.

9. The apparatus described in claim 8 characterized by the bar being of continuous extent at an upper end which contacts with the leaves to make an elongated weld, and having its lower end formed into separate downwardly extending projections, and electric resistance coils wrapped around said projections for maintaining the heat of the bar, and thermostatic means located along the bar in position to be heated by the bar and connected in the circuit with the resistance elements for regulating the current to the elements to keep the temperature of the bar below the scorching temperature of the paper with which the apparatus is intended to be used.

References Cited

UNITED STATES PATENTS

| | | | |
|---|---|---|---|
| 3,236,174 | 2/1966 | Hutchinson et al. | 156—583 |
| 3,303,084 | 2/1967 | Schwanekamp et al. | 156—583 |
| 2,422,525 | 6/1947 | Brown et al. | 156—290 |
| 3,272,674 | 9/1966 | Sachs | 156—583 |
| 3,668,048 | 6/1972 | Noguchi et al. | 156—583 |

DOUGLAS J. DRUMMOND, Primary Examiner